United States Patent

Mihic

[11] Patent Number: 5,382,119
[45] Date of Patent: Jan. 17, 1995

[54] CHIP FORMING INSERT, ESPECIALLY FOR TURNING AND SLOTTING

[75] Inventor: Wlajko Mihic, Gävle, Sweden
[73] Assignee: Mircona AB, Gävle, Sweden
[21] Appl. No.: 140,035
[22] PCT Filed: Apr. 28, 1992
[86] PCT No.: PCT/SE92/00278
 § 371 Date: Mar. 17, 1994
 § 102(e) Date: Mar. 17, 1994
[87] PCT Pub. No.: WO92/19402
 PCT Pub. Date: Nov. 12, 1992
[30] Foreign Application Priority Data
 Feb. 5, 1991 [SE] Sweden ................. 9101324
[51] Int. Cl.6 .................. B23B 27/08; B23B 27/22
[52] U.S. Cl. .................... 407/116; 407/117
[58] Field of Search .............. 407/115, 116, 117

[56] References Cited

U.S. PATENT DOCUMENTS 4,583,887  4/1986  Wertheimer ............... 407/116
4,957,396  9/1990  Niebauer ................... 407/114
4,973,204  11/1990  Mihic ......................... 407/116

FOREIGN PATENT DOCUMENTS 0222951  5/1987  European Pat. Off. ...... B23B 27/04
0245225  11/1987  European Pat. Off. ...... B23B 27/04
461635  3/1990  Sweden .................... B23B 27/04

Primary Examiner—William E. Terrell
Attorney, Agent, or Firm—Ware, Fressola, Van Der Sluys & Adolphson

[57] ABSTRACT

The invention relates to a cutting insert for machine tools wherein the insert adjacent its cutting edge has a chip forming device. The insert has a cutting edge and a planar surface adjoining the cutting edge. A recess is located downstream of the cutting edge and adjoining the planar surface. Various surfaces defining the recess are designed to engage a formed chip and bend it laterally. Obliquely upwardly directed abutment surfaces adjoining the planar surface are adapted to engage the edge flanks of the chip and bend the chip upwardly for breaking the chip into pieces.

2 Claims, 1 Drawing Sheet

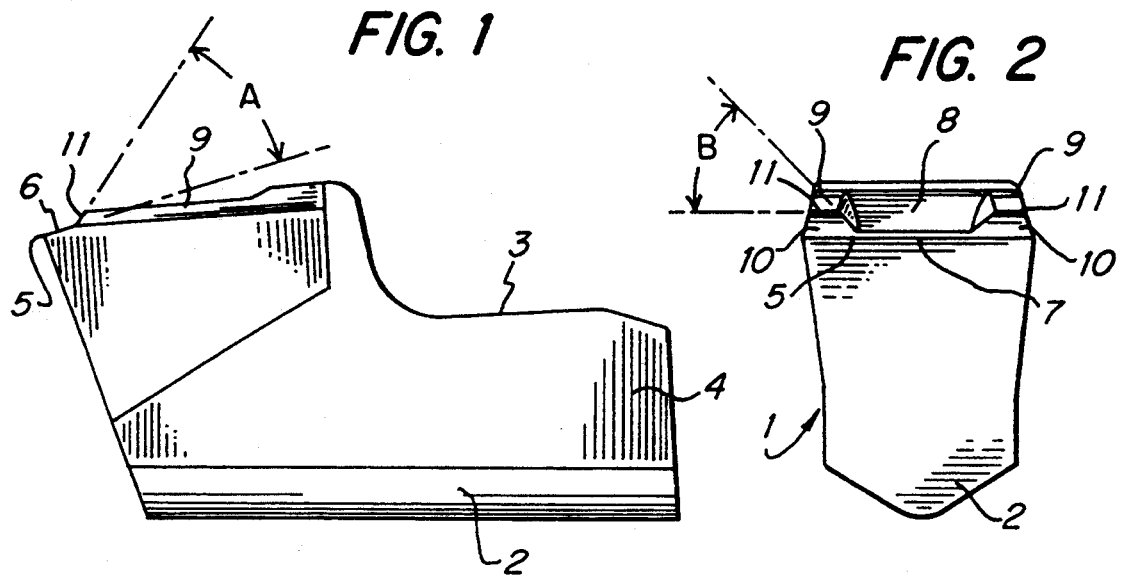
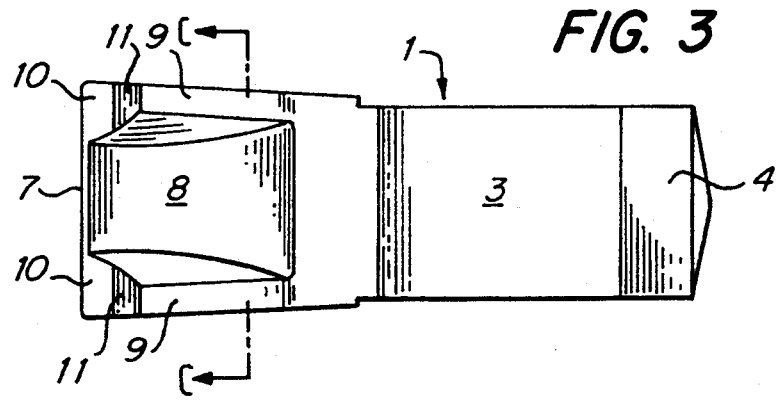
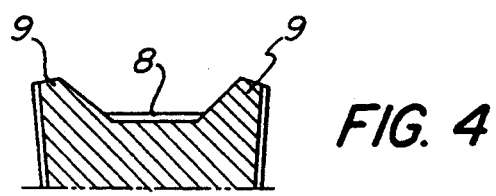

CHIP FORMING INSERT, ESPECIALLY FOR TURNING AND SLOTTING

BACKGROUND OF THE INVENTION

1. Technical Field of the Invention

This invention relates to cutting bits or inserts for cutting work especially turning wherein the insert is detachably held in a tool holder of a lathe or similar machining apparatus.

2. Description of the Prior Art

Within the technical field is known a cutting bit insert which adjacent to the cutting edge presents a recess, down into which the middle portion of the chip is pressed during the machining operation. The side portions of the insert are kept in a somewhat higher plane in order to give the chip a lateral bending so that it will have less width than it has just upon leaving the cutting edge and thereby becomes narrower than the groove cut. The laterally bent chip can then roll itself and form a coil, which is narrower than the turned groove and does not causes damage to the machined surfaces or the like.

Within this field, it is also known to arrange, remote from the cutting edge of any tool, a chip breaker, that is a protruding portion which will be engaged by the cut chip in order to be guided away abruptly. This results in a breaking of the chip preventing it from forming continuous coils, spirals or spools which in turn might cause tool damages or damage to the work piece and machined surfaces. However, in this arrangement the chip is subjected to deformation during the breaking off process which increases its lateral width and tends to cause congestion of chips and poor surface finish on the side surfaces of the groove.

One essential aspect of this invention is to provide a new cutting insert that causes lateral bending of the chip and also causes it to break thereby producing short chips having less width than the groove cut. Such chips being easily removed from the groove without tendency to adhere to the sides of the groove, the tool or the like.

SUMMARY OF THE INVENTION

The cutting insert according to the present invention has projections arranged downstream of the cutting edge, in the direction of movement of the chip, to guide the chip away from the planar surface adjacent the cutting edge and act as chip breaker. The projections being arranged laterally remote from each other. Between the projections adjacent the cutting edge, is a concave middle recess having obliquely arranged and concave surfaces along its sides.

A chip cut from a work piece slides inwardly over the middle recess arranged adjacent the cutting edge and is thereupon subjected to an initial lateral bending as the portion of the chip still attached to the work piece presses the free portion of the chip against the surface adjacent the cutting edge. Simultaneously, the edge flanks of the chip are guided by the side portions of the planar surface on either side of the recess toward the projections. The force the chip still attached to the work piece by an intermediate portion and pushed forwardly thereby to bend upwardly so the chip portion between the projections eventually leaves the bottom of the middle recess and floats freely between the projections. With the chip then heavily deformed both in its length and lateral directions, the chip will break beyond the top portions of the projections and form laterally bent or arched and lengthwise curved short chip pieces having smaller width than the groove cut by the cutting edge.

BRIEF DESCRIPTION OF THE DRAWING

The above as well as other features and advantages of the invention will be apparent through consideration of the detailed description in connection with the several drawings in which:

FIG. 1 is a side elevational view showing a cutting insert according to the invention, FIG. 2 is a front elevational view of the same insert, FIG. 3 is a top plan view of the cutting insert, and FIG. 4 is a cross-sectional view taken along the line C—C of FIG. 3.

DETAILED DESCRIPTION OF THE INVENTION

The cutting insert 1, the main features of which essentially correspond to those of a known insert, has a V-shaped bottom ridge 2 and an upper abutment surface 3. The V-shaped bottom ridge 2 is intended to cooperate with a V-groove (not shown) of an insert holder (not shown) while the upper abutment surface 3 is intended to be engaged by an abutment portion (not shown) of the holder in order to hold it in position in the insert holder by grasping the shank portion 4 of the insert 1.

The insert 1 has a front edge 5 and a planar surface 6. The surface 6 has a middle portion 7 and side portions 10. The middle portion 7 is narrower in the direction of movement of the chips than the wider side portions 10. The middle portion 7 passes into recess 8 having a concave bottom and defined by convex outwardly inclined side walls 9.

The recess 8 permits the central portion of the cut chip (not shown) to be displaced downwardly below the level of the edge flanks of the chip which are guided by the side portions 10 of the surface 6 thereby bending or arching the chip in a lateral direction. The side walls 9 have end edges 11 adjoining the side portions 10 of the surface 6 to form chip breaking abutments. The edge flanks of the chip are guided abruptly upward by these end edges 11.

Preferably, the angle A (FIG. 1) between the surface 6 and the end edges 11 serving as the chip breaker is in the range 45° to 65° and is preferably about 55°. Further, the angle B (FIG. 2) between same surface 6 and the surfaces of the side walls 9 defining the recess 8 is in the range 20° to 40° and is preferably 30° about 30°.

The lateral bending of the chip through cooperation of the surface 6 and the recess 8 results in a reduction of the width of the chip so it becomes considerably narrower than the groove cut by the insert 1. The chip thereby avoids contact with the sides of the groove which would otherwise cause the chip to be pulled along the work piece or tools causing damage thereto. The guiding or bending upwardly of the laterally bent chip through contact with the end edges 11 results in the chip breaking off in rather short pieces because of the high material stress brought about by the deformations. The small pieces fall away from the working area without causing damage. A cutting fluid can be added during the cutting process to facilitate the removal of the broken off pieces of chip.

The invention is not limited to the embodiment shown above but can be varied within the framework of the following patent claims.

I claim:

1. A cutting insert for mounting in an insert holder of a lathe or similar machining apparatus for performing a cutting operation on a work piece, comprising:
   (a) a cutting edge;
   (b) a surface adjoining said cutting edge and extending in a plane, said surface having a middle portion and two side portions adjacent said middle portion;
   (c) bottom and side recess surfaces defining a recess adjoining said middle portion of said surface adjoining said cutting edge downstream in a direction of movement of a chip cut from the work piece, said side surfaces of said recess being obliquely arranged at an angle in a range of 20° to 40° relative to the plane of said surface adjoining said cutting edge, said bottom and side surfaces of said recess positioned to engage and laterally bend a central portion of the chip as the chip is fed rearwardly from said cutting edge while edge flanks of the chip are carried by said side portions of said surface adjoining said cutting edge; and
   (d) an abutment end surface adjoining each of said side portions of said surface adjoining said cutting edge and positioned downstream in a direction of movement of the chip cut from the work piece, said abutment end surfaces being arranged at angle in a range of 45° to 65° relative to the plane of said surface adjoining said cutting edge, whereby said abutment end surfaces engage the edge flanks of the chip for continually bending the edge flanks away from the plane of said surface adjoining said cutting edge and causing an abrupt bending of the chip which results in a breaking of the chip.

2. The cutting insert according to claim 1, wherein the angle between the plane of said surface adjoining said cutting edge and said abutment end surfaces is 55° and the angle between the plane of said surface adjoining said cutting edge and said recess side surfaces is 30°.

* * * * *

UNITED STATES PATENT AND TRADEMARK OFFICE
CERTIFICATE OF CORRECTION

PATENT NO. : 5,382,119
DATED : January 17, 1995
INVENTOR(S) : WLAJKO MIHIC

It is certified that error appears in the above-indentified patent and that said Letters Patent is hereby corrected as shown below:

Cover page, Section [30], "Feb. 5, 1991" should be --May 2, 1991--.

Col. 1, line 31, after "arrangement", --,-- should be inserted.

Col. 1, line 51, "," should be deleted.

Col. 1, line 62, --projections-- should be inserted after "The".

Signed and Sealed this

Ninth Day of May, 1995

BRUCE LEHMAN

Attest:

Attesting Officer

Commissioner of Patents and Trademarks